United States Patent [19]
Willard

[11] Patent Number: 5,334,919
[45] Date of Patent: Aug. 2, 1994

[54] MOTOR CONTROL SYSTEM HAVING IMPROVED DYNAMIC BRAKING

[75] Inventor: Frank G. Willard, Oakmont, Pa.
[73] Assignee: Cleaveland/Price Inc., Trafford, Pa.
[21] Appl. No.: 76,433
[22] Filed: Jun. 11, 1993
[51] Int. Cl.$^5$ ............................................. H02P 3/12
[52] U.S. Cl. ............................................. 318/375
[58] Field of Search .................. 318/362, 375–381, 318/757–762, 703, 86–87

[56] References Cited

U.S. PATENT DOCUMENTS

| | | | |
|---|---|---|---|
| 2,575,021 | 11/1951 | Leitch et al. | |
| 3,260,908 | 7/1966 | Bostwick. | |
| 3,463,991 | 8/1969 | Yuminaka et al. | |
| 3,628,112 | 12/1971 | Cross | 318/369 X |
| 3,792,330 | 2/1974 | Ottoson | 318/375 |
| 3,851,233 | 11/1974 | Sherman | 318/375 X |
| 3,872,363 | 3/1975 | Cross | 318/377 X |
| 4,166,240 | 8/1979 | Russell | 318/380 |
| 4,386,299 | 5/1983 | Pham | 318/375 |
| 4,554,999 | 11/1985 | Kamaike | 318/376 X |
| 5,184,049 | 2/1993 | Kuichi. | |
| 5,189,360 | 2/1993 | Schwartz et al. | 318/382 X |

OTHER PUBLICATIONS

Standard Handbook for Electrical Engs. McGraw-Hill, Sec. 15–464, pp. 1304–1305.

Primary Examiner—William M. Shoop, Jr.
Assistant Examiner—David Martin
Attorney, Agent, or Firm—W. D. Palmer

[57] ABSTRACT

Motor control system for reversible series DC electric motor having improved dynamic braking performance for smoothly, rapidly, and consistently stopping the motor armature rotation so that any operated devices are similarly stopped at a predetermined location. The control system uses a bridge conformed like a full-wave rectifier together with a series of switches having open and closed positions to control the direction of current through the armature. The current through the motor field winding is always in the same direction. Provision is made to insure operation of a complete cycle once the system is initially energized and the switches which control the direction of current through the armature are protected from arcing upon opening.

12 Claims, 5 Drawing Sheets

MOTOR CONTROL SYSTEM HAVING IMPROVED DYNAMIC BRAKING

CROSS-REFERENCE TO RELATED APPLICATION

In copending application Ser. No. 076,439, filed concurrently herewith by the present inventor and owned by the present assignee (Attorney Docket No. WDP932) is disclosed an improved dynamic braking system for a unidirectional motor.

BACKGROUND OF THE INVENTION

1. Field of the Intention

This invention relates to control systems for motors and, more particularly, to a motor control system having improved motor dynamic braking.

2. Description of the Prior Art

Dynamic braking for electric motors has been in widespread use for over eighty years. The 1915 Edition of the Standard Handbook for Electrical Engineers, McGraw-Hill Sec. 15,-464, pages 1304–05 defines dynamic braking as follows: " . . . the retardation of a machine by a motor acting as a generator. The subject of dynamic braking may be divided into two parts as follows: first, for the purpose of effecting a quick stop; second, for the retardation of a descending load."

Recently, an article in Machine Design, June, 1992 at page 484 notes that: "Dynamic braking of dc motors occurs when the armature terminals are disconnected from the power supply and then connected together, while the field is energized. The resultant armature current from the counter-emf voltage creates a magnetic field that opposes motor rotation."

In a field as old and commercial as dynamic braking of electric motors, the patent and technical literature is replete with examples of improvements. For example, U. S. Pat. No. 5,184,049 dated Feb. 2, 1993 to Kiuchi utilizes a switching mechanism for short-circuiting the power terminals of the stator windings of a three-phase motor once a brake signal is issued from the brake circuit. This rapidly brings the motor to a full stop. U.S. Pat. No. 3,260,908 dated Jul. 12, 1966 to Bostwick arrests the rotation of an AC motor by reversing the motor armature connections through an elaborate circuit to effect braking. U.S. Pat. No. 3,463,991 dated Aug. 26, 1969 to Yuminaka et al. utilizes a rectifier bridge and a single SCR switch to effect braking of a motor. U.S. Pat. No. 2,575,021 dated Nov. 13, 1951 to Leitch et al. describes a fairly complicated system in which motor field connections are reversed to obtain braking.

All of the commercial systems for dynamic braking tried to date have drawbacks, some of which are a lack of consistent operation and reliability and problems encountered with residual fields and delays in motor response and thus braking response. For some applications very reliable and consistent operation is a requirement and a typical example for such an application is a remote switch for a high-voltage circuit.

SUMMARY OF THE INVENTION

There is provided a motor control system for a reversible series DC motor which has an output shaft connecting to a driven member and which operates when energized to move the driven member. When energization is removed, the driven member is stopped in a smooth, rapid, and predictable fashion. The motor operates from a DC source and has connected thereto a bridge circuit conformed in the manner of a full-wave rectifier bridge having DC terminals of different polarities and AC terminals. The motor field winding connects between one output terminal of the DC source and that DC bridge terminal which has an opposite polarity, with the other DC terminal of the bridge connecting to the one DC source output terminal, preferably via a motor braking resistor. The conventional motor armature connects to the motor output shaft and one terminal of the armature connects via one AC terminal of the bridge to the opposite polarity DC terminal of the bridge. A first controllable switch having open and closed positions connects in circuit between a motor armature terminal and the opposite polarity DC terminal of the bridge. The other armature terminal connects via the other AC terminal of the bridge to the opposite polarity DC terminal of the bridge. A second controllable switch having open and closed positions connects in circuit between the other armature terminal and the opposite polarity DC terminal of the bridge. The other armature terminal also connects via a third controllable switch having open and closed positions to the other output terminal of the DC source, and the one armature terminal also connects via a fourth controllable switch having open and closed positions to the other terminal of the DC source.

The foregoing interconnected circuit is operated in such fashion that the selected opening and closing of the switches includes the following relationships to provide the specified system motor functions. When the first and third on-off switches are closed and the second and fourth switches are open, the motor is operated and rotates in a first direction. When the second and fourth switches are closed and the first and third switches are open, the motor is rotated in a second direction. When the first and second switches are closed and the third and fourth switches are open, any rotation of the armature is smoothly, rapidly, and predictably dynamically braked with the generated energy dissipated as heat in the braking resistor and the motor field winding.

BRIEF DESCRIPTION OF THE DRAWINGS

For a better understanding of the invention, reference should be made to the accompanying drawings wherein.

DESCRIPTION OF THE PREFERRED EMBODIMENTS

Figure 1:
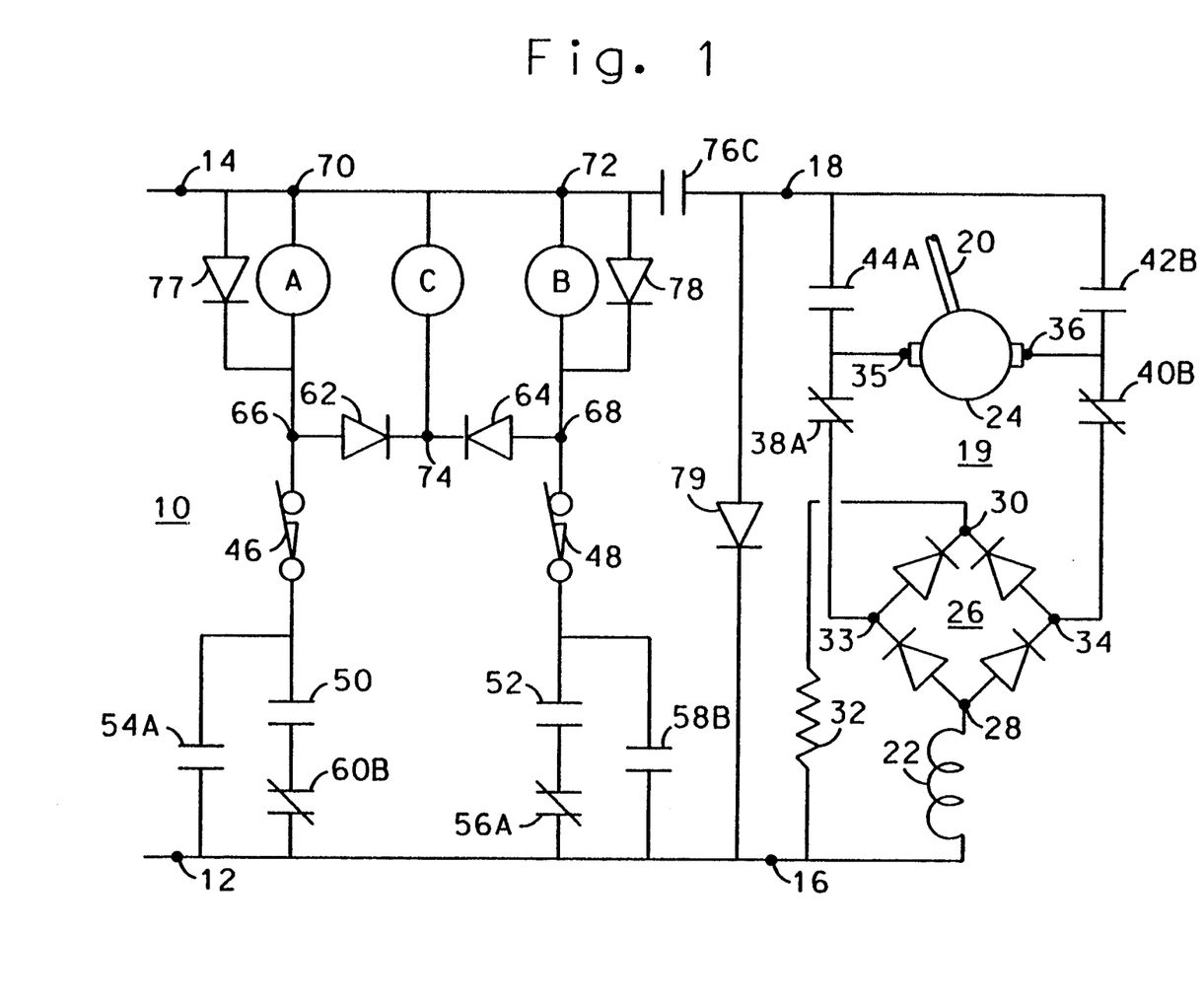
FIG. 1 is a circuit diagram of the motor control system.

In FIG. 1, the motor control system 10 is operable to be connected across the terminals 12 and 14 of a DC supply bus. For purposes of this description, additional output terminals 16 and 18 are shown and the primary system components as connected across these terminals 16 and 18 will be described first. The motor control system is designed for use with a reversible series DC electric motor 19 having a rotatable output shaft 20 shown schematically in this figure and which is connected to a driven member to be described hereinafter.

The motor includes a field winding 22 and a rotatable armature 24 which connects to and drives the output shaft 20. A diode bridge circuit 26 which is conformed as a full-wave rectifier has one DC terminal 30, usually marked (+), and another DC terminal 28, usually marked (−), and AC terminals 33 and 34. The motor field winding 22 connects between the DC terminal 16 and the bridge terminal 28 which has a polarity opposite to the polarity of the DC terminal 16. The bridge terminal 30 connects to D.C. source terminal 16 source via a braking resistor 32.

The rotatable motor armature 24 has two electric terminals 35 and 36. One terminal 35 of the armature 24 is electrically connected to the AC bridge terminal 33 via a first controllable two-position switch 38A having open and closed positions. The other electrical terminal 36 of the armature is connected via a second switch 40B having open and closed positions to the AC bridge terminal 34. The electrical terminal 36 of the armature is connected via a third switch 42B having open and closed positions to the other output terminal 18 of the DC source and the electrical terminal 35 of the armature is connected via a fourth switch 44A having open and closed positions to the other output terminal 18 of the DC source. In the showings in FIG. 1, the switches form parts of two operating relays A and B and the unenergized status of the relay switches is shown, that is, open or closed.

When the switches 38A, 40B, 42B and 44A are controlled they will be moved to a position opposite to that shown in FIG. 1. In the showings of FIGS. 2 through 6, for clarity of description, the positioning of the switches in their energized position, that is, open or closed, is shown. The circuit for selectively controlling the operation of the switches is shown in FIG. 1, and will be described hereinafter.

Figure 2:
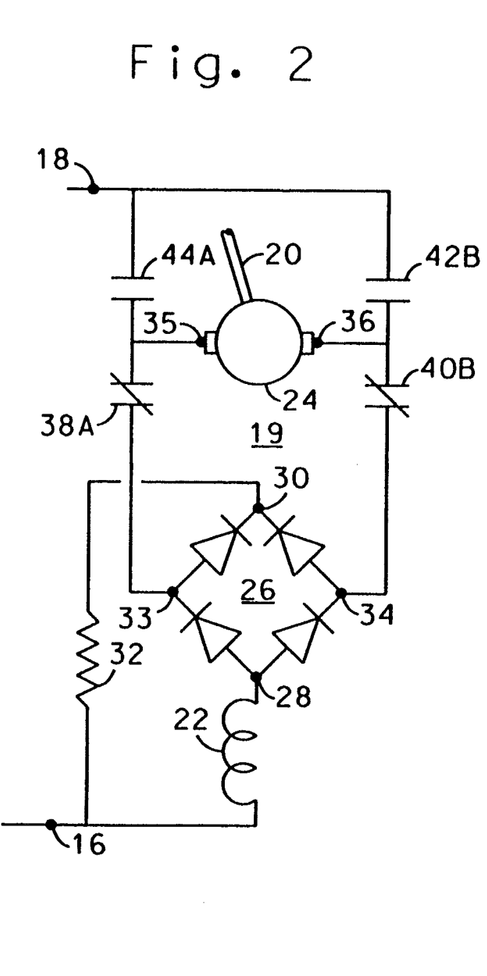
FIG. 2 is a schematic view of the unenergized state of the control system wherein the first and second switches are in their normally closed position and the third and fourth switches are in their normally open position, which isolates the motor from the power source.

In the showing of FIG. 2, the system is not energized and the motor is not rotating. In this unenergized and quiescent state, the first switch 38A and the second switch 40B are in their normally closed positions and the third switch 42B and fourth switch 44A are in their normally open positions. The motor is thus disconnected from the DC source and is connected for braking.

Figure 3:
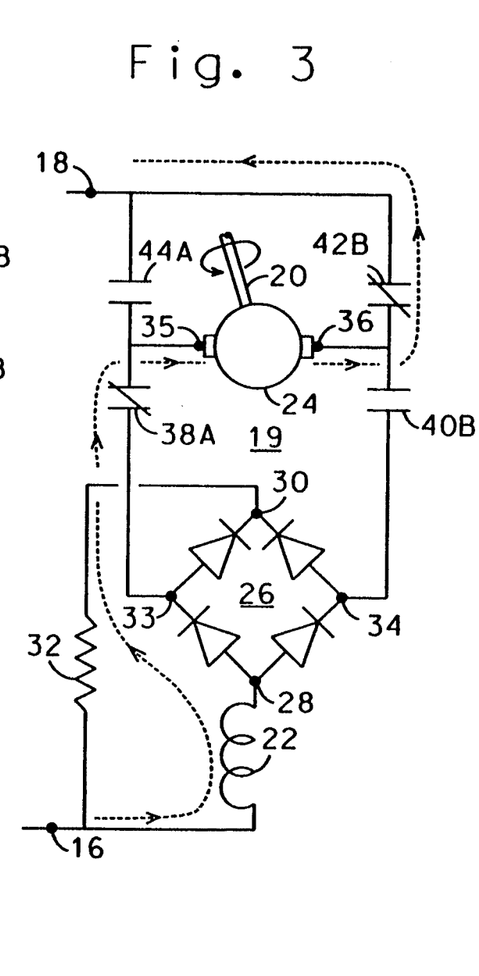
FIG. 3 is a schematic view of one system operating mode wherein the first and third switches are closed and the second and fourth switches are open to rotate the motor armature in one predetermined direction with the resultant current path shown.

In the showing of FIG. 3, the system is energized and the armature 24 is rotating in one predetermined direction, to drive a member toward a closed position, for example. To energize the system in this fashion, the normally closed first switch 38A is not energized so that it remains closed. The normally open third switch 42B is energized to a closed position. The normally closed second switch 40B is energized to an open position and the normally open fourth switch 44A is not energized and remains open. The current path, shown as a broken line, is from the terminal 16, through the motor field winding 22, through the bridge 26 from terminal 28 to terminal 33, the closed switch 38A and the armature 24, the closed switch 42B and to the terminal 18.

Figure 4:
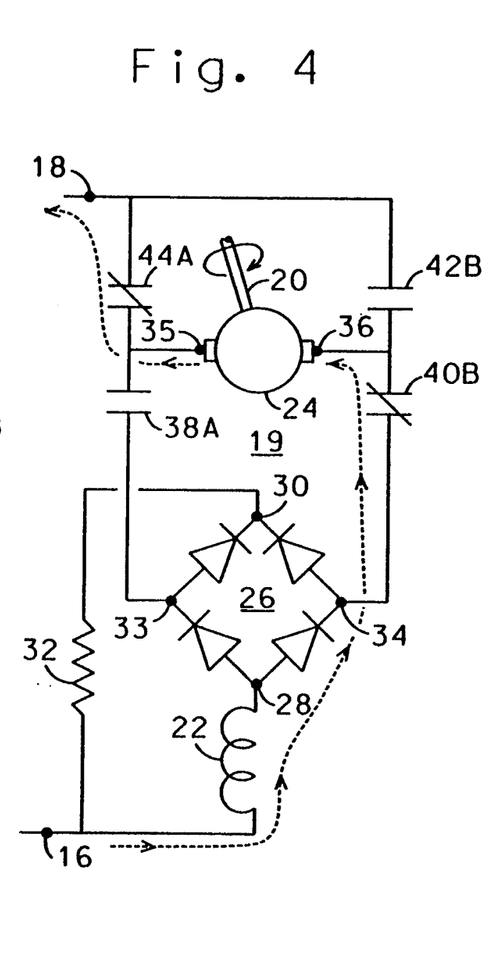
FIG. 4 is a schematic view of another system operating mode wherein the second and fourth switches are closed and the first and third switches are open-to rotate the armature in a second predetermined direction with the resultant current path shown.

In the showing of FIG. 4, the system is energized and the armature 24 is rotating in a direction opposite to that as shown in FIG. 3, that is, to drive a member toward an open position. To achieve this operating mode, the first switch 38A is energized to move from a closed to an open position, the second switch 40B is not energized so that it remains in its normally closed position, the third switch 42B is not energized so that it remains in its normally open position, and the fourth switch 44A is energized so that it is in a closed position. The resulting current path, shown as a broken line, is from the terminal 16, through the motor field winding 22, through the bridge 26 from terminal 28 to terminal 34, the closed switch 40B, the armature 24, the energized closed switch 44A and to the terminal 18.

Figure 5:
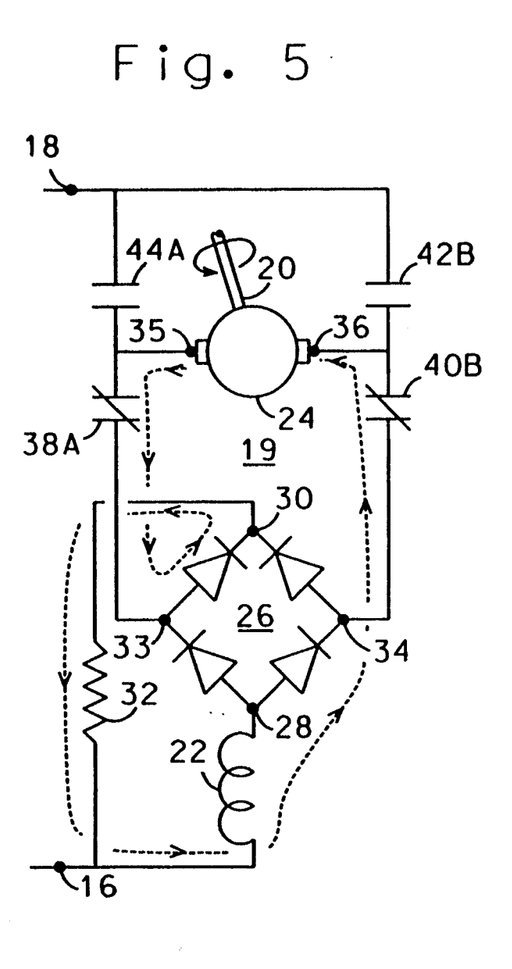
FIG. 5 is a schematic view of still another motor operating mode wherein the first and second switches are closed and the third and fourth switches are open with the armature rotating in one direction and being dynamically braked, with the resultant current path shown.

In the showing of FIG. 5, energization of the motor 19 has just been stopped and the armature 24 and output shaft 20 are still rotating along with any driven member (not shown in this Figure). Depending upon the apparatus being handled, the energy represented by the moving members can be substantial. The motor field winding 22 remains energized. By way of illustration, assume that the armature and output shaft direction of rotation is that which is required to close the driven apparatus, see FIG. 3. Previously, the direction of the current through the armature 24 was from terminal 35 to terminal 36, as shown in FIG. 3. Upon removal of motor energizing potential, as described hereinafter, the switch 38A closes, the switch 40B closes, and the switches 42B and 44A open. The resultant armature current from the counter emf voltage creates a magnetic field that opposes motor rotation. The created armature current is opposite in direction to the previous direction of current through the armature when energized. Comparing FIGS. 3 and 5, the generated current, shown in broken lines, is now through the armature 24 from terminal 36 to terminal 35, through the closed switch 38A, through the bridge 26 from terminal 33 to terminal 30, through the braking resistor 32, through the field winding 22, through the bridge 26 from terminal 28 to terminal 34, through the closed switch 40B and to the armature 24. The direction of current through the field winding 22 is always the same. The result is that the rotation of the armature 24 and output shaft 20 is rapidly, smoothly, and predictably dynamically braked. The braking resistor 32 contributes to the braking effect with the larger the value of the resistor, the less the generated current and the slower the braking. For some application, the braking resistor 32 can be dispensed with and replaced with a simple wire connection.

Figure 6:
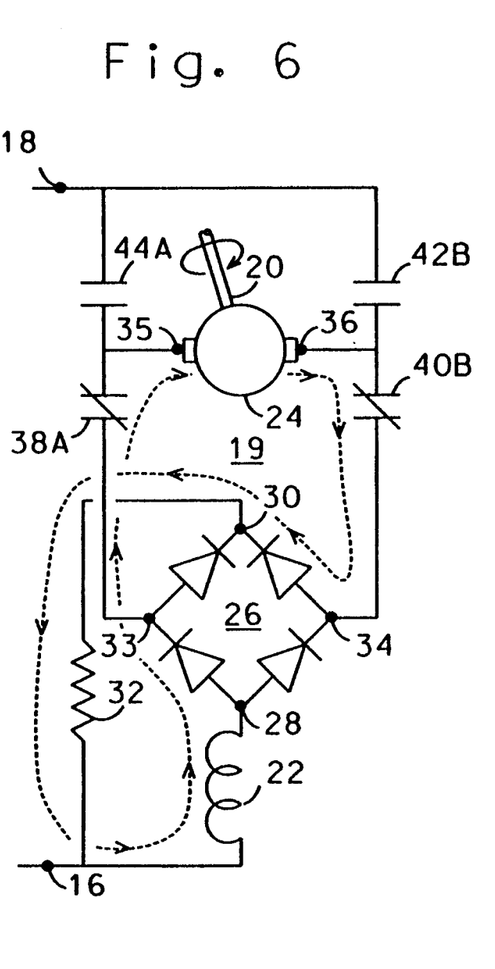
FIG. 6 is a schematic view similar to that shown in FIG. 5 except that the dynamically braked armature is rotating in the opposite direction, with the resultant current path shown.

The showing in FIG. 6 is similar to that of FIG. 5, except that the residual rotation of the armature 24, shaft 20 and driven member is the same as that shown in FIG. 4. In this case the current path, shown in broken lines, is through the armature 24, through the closed switch 40B, from terminal 34 to terminal 30 of the bridge 26, the braking resistor 32, the motor field winding 22, from terminal 28 to terminal 33 of the bridge 26, the closed switch 38A and thence to the armature Referring again to FIG. 1, the components used to apply the basic circuit to a practical application are bounded by the input terminals 12, 14 and 16, 18. The relay operating coils A and B are used to operate the switch members 38A, 40B, 42B and 44A which are followed by the same letter as well as four additional switches described hereinafter. Thus the operating coil A is used to operate the switches 38A and 44A and the operating coil B is used to operate the switches 40B and 42B. Limit switch 46 is used to sense a limit of motion for the driven member upon opening and limit switch 48 is used to sense a limit of motion for the driven member upon closing.

By way of example, let the motor output shaft 20 be connected to a driven member having two definite and limited motions, such as a switch for a high voltage transmission line which is to be opened or closed. The limit switches 46 and 48 detect the proper ending for each of the motions and then open to stop the rotation of the motor output shaft 20. Forward switch 50 upon closure will initiate forward operation of the control system and can take the form of a push-button or relay-actuated momentary contact. Reverse switch 52 will initiate reverse operation of the system and also can be a push-button or relay-actuated momentary contact. Suppose forward switch 50 is operated by momentary closure. This energizes the coil A and as long as the limit switch 46 remains closed the relay coil A will remain energized, This will close the normally open switch 54A which will by-pass the contact 50. Thus the relay coil A will remain energized until the limit switch 46 is opened by the completed opening of the high-voltage transmission line switch which is the final driven element.

The reverse contact member 52 is rendered inoperative by energization of the coil A since this opens the normally closed contact 56A which is in series with the reverse contact 52. The normally open switch 54A is maintained in closed position and this "seals in" the operation of the system until the limit switch 46 opens. Also, the opening of the normally closed switch 56A prevents any reaction from accidental closure of the reverse switch 52 while the coil A is energized. This prevents any mid-way reversing or So-called pumping of the system.

The forward or opening actuation of the system has been described and the reverse or closing operation is the same. While the relay coil B is energized, the normally open switch 58B is closed and the normally closed switch 60B is open.

Summarizing the foregoing, the normally open first actuating switch 50 is in series with a limit switch 46 and the coil A which operates the switches 38A and 44A. The series-connected members 50, 46 and coil A are connected across the DC terminals 12, 14. The limit switch 46 has an open position and a closed position and when in the open position, operates to remove energization from the coil A which in turn closes the first on-off switch 38A and opens the fourth on-off switch 44A.

The opening of the limit switch is actuated by movement of the driven member to a predetermined position, such as a fully open position of a high-voltage switch. The reverse action of the system is the same except that the coil B is energized which operates the switches 40B and 42B.

Once either of the limit switches 46 or 48 has been opened with the motor output shaft rotating, the coil A or B in series therewith is de-energized which disconnects the armature from the DC source and permits the dynamic braking action to arrest all rotation of the output shaft 20. Also, once there is even momentary closure of the actuating switches 50 or 52, the system will remain energized until the appropriate limit switch 46 or 48 is opened.

Diodes 62 and 64 are connected at like poles across the terminals 66 and 68 of the coils A and B. An additional coil C connects between the terminals 70, 72 of the coils A and B and the pole-to-pole connection 74 of the diodes 62 and 64. The switch 76C which is actuated by relay coil C connects in the DC supply between the terminals 14 and 18. Coil C is energized when either coil A or coil B is energized and is de-energized when both coils A and B are de-energized. The contact 76C acts as a circuit breaker. The contact 76C is slightly faster in dropout than either of the relays actuated by the coils A and B in order to assure non-arcing switching of those contacts which connect to the motor armature. The additional diodes 77 and 78 which connect across the coils A and B serve to slow the drop-out of these relays. The diodes 62 and 64 provide that coil C operates its relay whenever the relays associated with coil A or B operate, but coil C operates its relay at a slightly reduced current which causes that relay to drop-out slightly ahead of the relays actuated by coils A and B.

The armature discharge diode 79 provides the magnetic field energy surrounding the armature with a discharge path when the contact 76C opens. As a result, contact 76C must interrupt only what appears as a resistive load, rather than interrupting an inductive load. The diodes of bridge 26 serve the same function, providing an energy discharge path for the motor field winding 22 and at the same time assuring that the motor magnetic field does not collapse during the transition from motor operation to braking operation.

Figure 7:
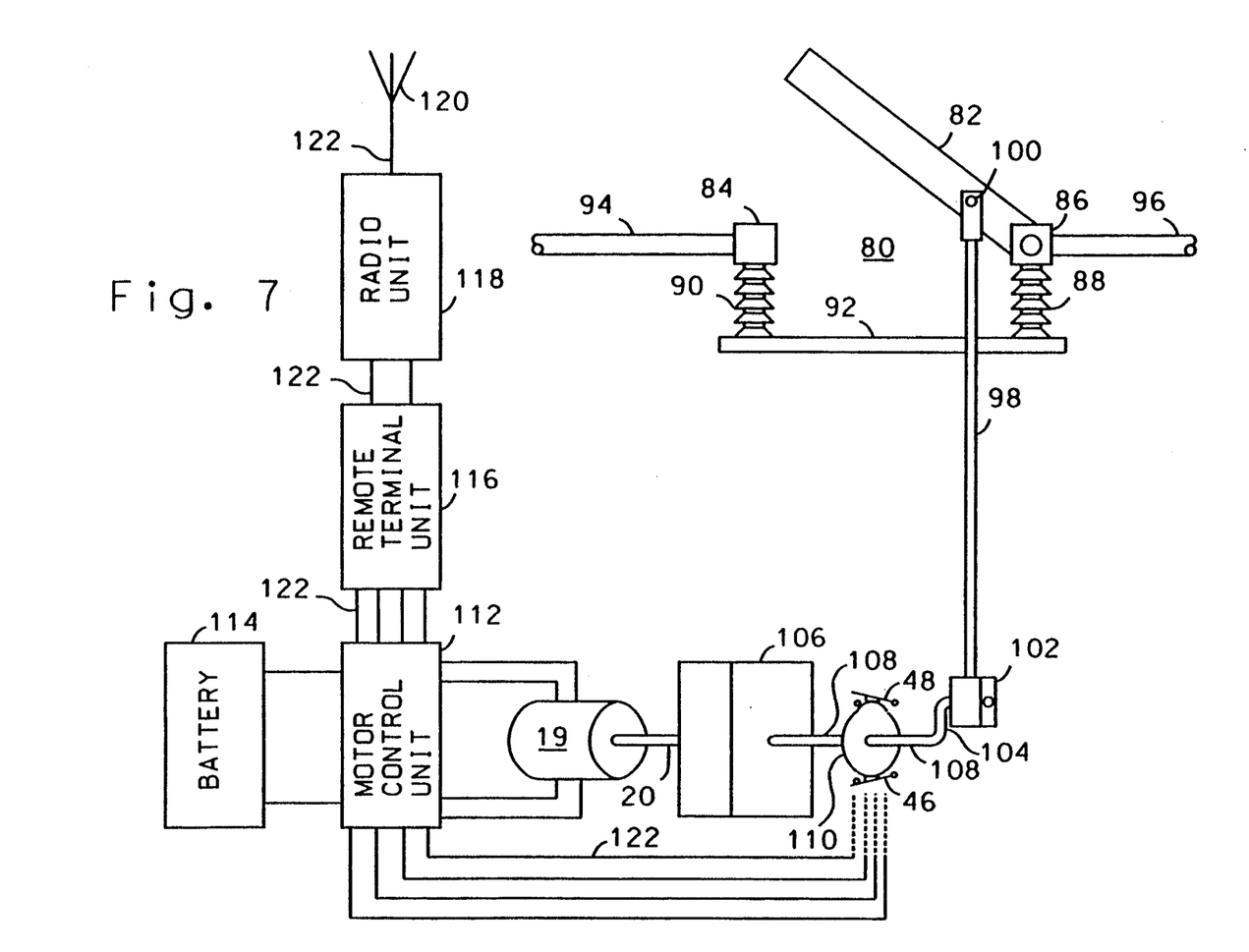
FIG. 7 is an elevational view of a motor driven member which typically is a switch contact member for a remote high-voltage switching device.

In FIG. 7 is a generally schematic showing of a driven member which comprises a remote-controlled high-voltage switching device 80 which can be mounted near the top of a wooden pole. The usual practice is to employ three sets of these switches, one for each of three phases in a three-phase high-voltage AC power transmission system. For clarity, only a single phase is shown in FIG. 7. The switching device comprises a moving metal contact blade 82, a fixed contact 84, bearing contact 86, supporting insulators 88, 90 and a rigid frame member 92. The switch contacts 84 and 86 are electrically connected to different segments 94 and 96 of a high-voltage power line.

The contact blade 82 is actuated by an insulated, actuating rod 98 which attaches to the blade 82 by a hinged connection 100. The other end of the rod 98 connects through a bearing block 102 to a crank 104. A gearbox 106 interconnects the drive shaft 108 with the output shaft 20 of motor 19. A cam 110 is affixed to the shaft 108 and actuates the limit switches, 46, 48, as previously described, when a predetermined positioning of the switch blade 82 has been achieved, that is, fully open or fully closed.

Operation of the motor 19 is by the control circuitry 112, as shown in detail in FIG. 1 and the primary power supply is by battery 114 which can float on stepped down and rectified power from the power line. A communications device, typically termed a "Remote Terminal Unit" 116 cooperates with a radio unit 118 and its antenna 120 to provide remote control for the high-voltage switch operation. The electrical interconnections 122 for the foregoing units are shown schematically. The unit is normally provided with a weatherproof casing which may contain heater elements, as required. To operate a typical unit as shown in FIG. 7, the motor can be rated at about one horsepower and the diode bridge 26 is rated at 4-amp. 600 volts. The relays 38A. 44A, 40B and 42B are rated to carry ten amperes.

In the foregoing description, it will be understood that specified polarities and current flows have been set forth for clarity of explanation. These may be reversed without harming operation of the system.

While the control system has been described as useful for a remote-control switch for a power line, it can also be used to control any type of device, an example being valves in a chemical plant.

Various alternative embodiments can be used for the bridge 26 which can be modified by placing switches in different locations. As an example, refer to FIG. 8 wherein the diodes comprising the bridge 26 are numbered D1, D2, D3 and D4. In the modified embodiment as shown the switch 40B has been moved to a location intermediate the diode D2 and the terminal 34 and the switch 38A has been moved to a location intermediate the diode D3 and the terminal 33. With such a modification, at the onset of braking the armature current will be immediately established via diode D1 of the bridge to the braking resistor 32 and any tendency to develop arcing in the milliseconds it takes to open the switch 42B (see FIG. 5) will be minimized.

Figure 9:
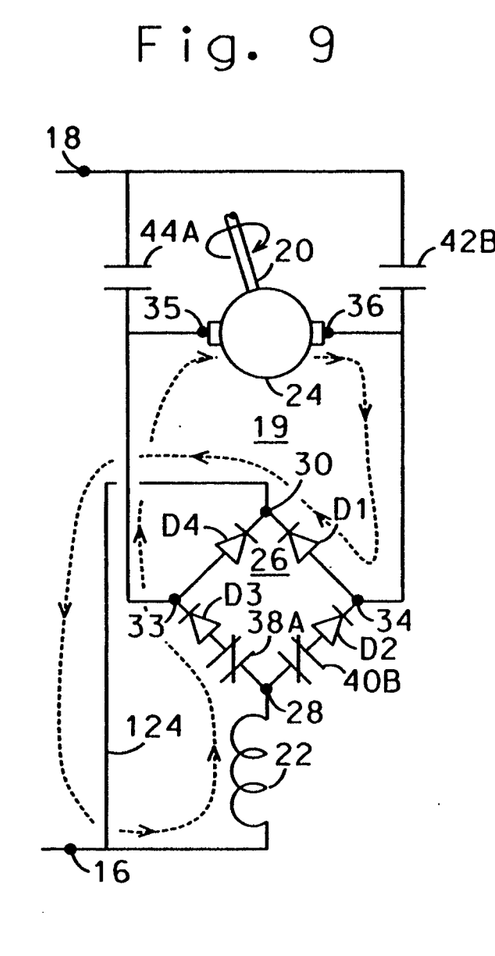

The embodiment shown in FIG. 9 generally corresponds to FIG. 6 except that the switch 38A has been moved to a position intermediate the diode D3 and terminal 28 and switch 40B has been moved to a position intermediate the diode D2 and terminal 28. This will minimize any tendency for arcing of the switch 44A in the milliseconds it takes to open the switch 44A, see FIG 6.

Figure 8:
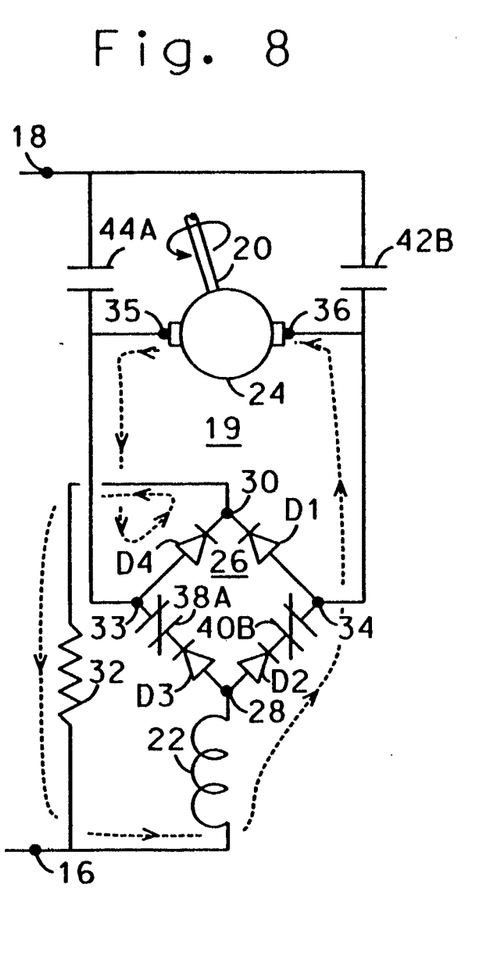
FIGS. 8 and 9 are schematic views corresponding to FIGS. 5 and 6 but showing alternative embodiments wherein the positioning of some of the switches has been changed to locate them in the bridge.

Briefly summarizing the foregoing different embodiments, one electrical terminal 35 of the motor armature is adapted to be connected via one AC terminal 33 of the bridge to the opposite polarity DC terminal 28 of the bridge. The first controllable open or closed switch 38A can be positioned in circuit anywhere between the armature terminal 35 and the opposite polarity DC terminal 28 Thus the switch 38A can be positioned in circuit between the armature terminal 35 and the AC terminal 33, or between the AC terminal 33 and the diode D3, or between the diode D3 and the terminal 28. In similar fashion, the switch 40B can be placed in any of three different positions, as shown in FIGS. 5, 7 and 8.

I claim as my invention:

1. A motor control system for a reversible series DC electric motor, said motor having an output shaft adapted to be connected to a driven member, and said system when energized operable to rotate said output shaft to move said driven member and when energization is removed to smoothly, rapidly, and consistently stop rotation of said output shaft and movement of said driven member, said control system comprising:

a DC source having output terminals of predetermined polarities;

a motor field winding forming an integral part of said series DC motor, a bridge circuit conformed as a full-wave rectifier and having DC terminals of different polarities and AC terminals, said motor field winding electrically connecting between one output terminal of said DC source and the one DC terminal of said full-wave rectifier bridge which has a polarity opposite to the polarity of said one output terminal of said DC source, and the other DC terminal of said full-wave rectifier bridge connecting to said one output terminal of said DC source;

a rotatable motor armature having two electric terminals and forming an integral part of said series DC motor, said motor armature connecting to and operable to drive said rotatable output shaft, one electric terminal of said motor armature adapted to be connected via one AC terminal of said full-wave rectifier bridge to said one DC terminal of said bridge, a first controllable open or closed switch connected in circuit between said one motor armature terminal and said one DC terminal of said bridge, the other electric terminal of said motor armature adapted to be connected via said other AC terminal of said bridge to said one DC terminal of said bridge, a second controllable open or closed switch connected in circuit between said other motor armature terminal and said one DC terminal of said bridge, said other electric terminal of said motor armature also adapted to be connected via a third controllable open or closed switch to the other output terminal of said DC source, and said one electric terminal of said motor armature also adapted to be connected via a fourth controllable open or closed switch to said other output terminal of said DC source;

and means for selectively controlling the opening and closing of said open or closed switches including the following open and closed relationships to produce the following system functions: when said first and third switches are closed and said second and fourth switches are open, said armature and connected output shaft rotate in one direction to move said driven member in one predetermined direction; when said second and fourth switches are closed and said first and third switches are open, said armature and connected output shaft rotate in an opposite direction to move said driven member in another predetermined direction; and when said first and second switches are closed and said third and fourth switches are open, any rotation of said armature and output shaft and movement of said driven member are smoothly and rapidly dynamically braked.

2. The motor control system as specified in claim 1, wherein said first open or closed switch is connected in circuit between said one electrical terminal of said motor armature and said one AC terminal of said bridge, and said second open or closed switch is connected in circuit between said other electrical terminal of said motor armature and said other AC terminal of said bridge.

3. The motor control system as specified in claim 1, wherein said first open or closed switch is connected in circuit between said one AC terminal of said bridge and said one DC terminal of said bridge, and said second open or closed switch is connected in circuit between said other AC terminal of said bridge and said one DC terminal of said bridge.

4. The motor control system as specified in claim 1, wherein said first switch and said second switch are normally closed and are operable to be actuated to an open position, and said third switch and said fourth switch are normally open and are operable to be actuated to a closed position.

5. The motor control system as specified in claim 1, wherein a braking resistor connects between said other DC terminal of said full-wave bridge rectifier and said one DC source terminal to which said motor field winding connects, and the larger the value of said braking resistor, the slower the dynamic braking of said system.

6. The motor control system as specified in claim 1, wherein:
   a normally open first actuating switch means connects in series with a first limit switch means and a first relay coil which is operable to actuate said first and fourth switches, said series-connected first actuating switch means and said first limit switch means and said first relay coil are connected across the terminals of said DC source; said limit switch means having an open and a closed position and when in open position, operates to remove electrical energization from said first relay coil to open said fourth switch and close said first switch, and said limit switch being actuated to an open position by movement of said driven member to a first predetermined desired location;
   a normally open second actuating switch means connects in series with a second limit switch means and a second relay coil which is operable to actuate said second and third switches, said series-connected second actuating switch means and said second limit switch means and said second relay coil are connected across the terminals of said DC source, said second limit switch means having an open and a closed position and when in open position operates to remove electrical energization from said second relay coil to permit said second switch to remain closed and said third switch to remain open, and said second limit switch being moved to an open position by movement of said driven member to a second predetermined desired location; and
   actuation of either of said limit switches from a closed position to an open position with said motor armature rotating operating to remove all energization from said relay coils which in turn disconnects said motor from said DC source and permits the dynamic braking action of said motor to rapidly and smoothly stop rotation of said motor armature and output shaft and movement of said driven member.

7. The motor control system as specified in claim 6, wherein:
   said normally open first actuating switch means has connected in series therewith an additional normally closed switch having open and closed positions and which is actuated by said second relay coil, and an additional normally open switch having open and closed positions and which is actuated by said first relay coil is connected in parallel with said connected first actuating switch means and said additional normally closed switch which is actuated by said second relay coil, and even momentary closure of said first actuating switch means operating to energize said first relay coil which closes said additional normally open first coil actuated switch to maintain energization of said motor until said first limit switch opens to interrupt the circuit to said first relay coil; and
   said normally open second actuating switch means has connected in series therewith an additional normally closed switch having open and closed positions and which is actuated by said first relay coil, and an additional normally open switch which is actuated by said second relay coil is connected in parallel with said connected second actuating switch means and said additional normally closed switch which is actuated by said first relay coil, and even momentary closure of said second actuating switch means serving to energize said second relay coil to close said additional second-coil-actuated switch to maintain energization of said motor until said second limit switch opens to interrupt the circuit to said second relay coil.

8. The motor control system as specified in claim 7, wherein:
   said first relay coil and said second relay coil have first terminals and second terminals, said coils second terminals connected to said limit switches, first multiple diode means connected to each other at like poles, said multiple diode means also connected in series across said coils second terminals, an additional relay coil connected between said relay coils first terminals and the pole-to-pole connection of said multiple diode means to permit said additional relay coil to be energized when either of said first or second relay coils is energized;
   second individual diode means each connected across said first relay coil and said second relay coil to slow the drop-out of said relay coils, a circuit-breaking normally open switch having open and closed positions and which is actuated to a closed position by said additional relay coil, said circuit-breaking normally open switch connected between a terminal of the DC output and said motor, the operation of said circuit-breaking additional relay being slightly faster than the operation of said third and said fourth switches to cause said circuit-breaking relay to drop out faster than said third and said fourth switches to assure non-arcing switching of said switches connected to said motor armature.

9. The motor control system as specified in claim 8, wherein armature-discharge diode means connects across said DC source terminals intermediate said circuit-breaking relay and said motor, said armature-discharge diode means providing a discharge path for the armature magnetic field when the circuit-breaking relay opens.

10. The motor control system as specified in claim 7, wherein said driven member comprises a two-position open-close electric contact for a high-voltage line, and said first actuating switch means and said second actuating switch means are controlled from a location remote from said driven member.

11. The motor control system as specified in claim 10, wherein operation of said first actuating switch means and said second actuating switch means is initiated by a remote-controlled signal.

12. A motor control system for a reversible series DC electric motor, said motor having an output shaft adapted to be connected to a driven member, and said system when energized operable to rotate said output shaft to move said driven member and when energization is removed to smoothly, rapidly, and consistently stop rotation of said output shaft and movement of said driven member, said control system comprising:

- a DC source having output terminals of predetermined polarities;
- a motor field winding forming an integral part of said series DC motor, a bridge circuit conformed as a full-wave rectifier and having DC terminals of different polarities and AC terminals, said motor field winding electrically connecting between one output terminal of said DC source and the one DC terminal of said full-wave rectifier bridge which has a polarity opposite to the polarity of said one output terminal of said DC source, and the other DC terminal of said full-wave rectifier bridge connecting to said one output terminal of said DC source;
- a rotatable motor armature having two electric terminals and forming an integral part of said series DC motor, said motor armature connecting to and operable to drive said rotatable output shaft, one electric terminal of said motor armature adapted to be connected via a first controllable open or closed switch to one AC terminal of said full-wave rectifier bridge, the other electric terminal of said motor armature adapted to be connected via a second controllable open or closed switch to the other AC terminal of said full-wave rectifier bridge, said other electric terminal of said motor armature also adapted to be connected via a third controllable open or closed switch to the other output terminal of said DC source, and said one electric terminal of said motor armature also adapted to be connected via a fourth controllable open or closed switch to said other output terminal of said DC source;
- and means for selectively controlling the opening and closing of said open or closed switches including the following open and closed relationships to produce the following system functions: when said first and third switches are closed and said second and fourth switches are open, said armature and connected output shaft rotate in one direction to move said driven member in one predetermined direction; when said second and fourth switches are closed and said first and third switches are open, said armature and connected output shaft rotate in an opposite direction to move said driven member in another predetermined direction; and when said first and second switches are closed and said third and fourth switches are open, any rotation of said armature and output shaft and movement of said driven member are smoothly and rapidly dynamically braked.

* * * * *